US008037847B2

(12) United States Patent
Malnati et al.

(10) Patent No.: US 8,037,847 B2
(45) Date of Patent: Oct. 18, 2011

(54) CLOSURE SYSTEM FOR A CAGE CONTAINING LABORATORY ANIMALS AND METHODS THEREOF

(75) Inventors: Giovanni Malnati, Malnate (IT); Paolo Tamborini, Somma Lombardo (IT)

(73) Assignee: Tecniplast, S.p.A., Buguggiate (IT)

( * ) Notice: Subject to any disclaimer, the term of this patent is extended or adjusted under 35 U.S.C. 154(b) by 1025 days.

(21) Appl. No.: 11/429,763

(22) Filed: May 8, 2006

(65) Prior Publication Data
US 2006/0254528 A1    Nov. 16, 2006

Related U.S. Application Data (60) Provisional application No. 60/680,980, filed on May 13, 2005.

(51) Int. Cl.
*A01K 1/03* (2006.01)
(52) U.S. Cl. ........................................ 119/419; 119/418
(58) Field of Classification Search .......... 119/417–420;
277/630, 637, 641, 642
See application file for complete search history.

(56) References Cited

U.S. PATENT DOCUMENTS

| | | | | |
|---|---|---|---|---|
| 2,988,044 A * | 6/1961 | Adelberg et al. | ............. | 119/417 |
| 3,343,520 A * | 9/1967 | Schwarz, Jr. | .................. | 119/419 |
| 3,537,428 A * | 11/1970 | Montgomery | ................ | 119/419 |
| 4,344,646 A * | 8/1982 | Michel | ............................ | 292/87 |
| 4,480,587 A * | 11/1984 | Sedlacek | ........................ | 119/419 |
| 4,640,228 A * | 2/1987 | Sedlacek et al. | ............... | 119/419 |
| 5,924,384 A * | 7/1999 | Deitrich et al. | ................ | 119/419 |
| 5,971,191 A * | 10/1999 | Yamada et al. | ................ | 220/378 |
| 5,996,535 A | 12/1999 | Semenuk et al. | | |
| 6,142,101 A * | 11/2000 | Pelsor | .......................... | 119/61.54 |
| 6,257,171 B1 * | 7/2001 | Rivard | ........................... | 119/419 |
| 6,308,660 B1 | 10/2001 | Coiro, Sr. et al. | | |
| 6,543,387 B1 * | 4/2003 | Stein | ............................. | 119/419 |
| 6,557,857 B1 * | 5/2003 | Goodman | ...................... | 277/549 |
| 6,612,260 B1 * | 9/2003 | Loyd et al. | ..................... | 119/418 |
| 6,782,582 B2 * | 8/2004 | Firdaus et al. | ................... | 15/323 |
| 7,191,734 B2 * | 3/2007 | Strzempko et al. | ........... | 119/496 |
| 7,413,099 B2 * | 8/2008 | Takahashi et al. | ............ | 220/806 |
| 7,451,723 B1 * | 11/2008 | Gabriel et al. | ................. | 119/456 |
| 7,497,187 B2 * | 3/2009 | Ingley et al. | .................... | 119/417 |
| 2002/0069834 A1 * | 6/2002 | Deitrich et al. | ............... | 119/419 |
| 2003/0051676 A1 | 3/2003 | Rivard | | |

FOREIGN PATENT DOCUMENTS

| | | | |
|---|---|---|---|
| DE | 2007301 | | 2/1970 |
| FR | 2560157 A1 * | | 8/1985 |
| WO | 0211523 A1 | | 2/2002 |
| WO | 03096801 A1 | | 11/2003 |
| WO | WO 03/096801 A | | 11/2003 |

* cited by examiner

*Primary Examiner* — Kimberly Y Smith
(74) *Attorney, Agent, or Firm* — LeClairRyan, a Professional Corporation (57) ABSTRACT

A closure system for a cage containing laboratory animals, where in an upper edge of the base of the cage an U-shaped housing towards the outside of the edge hosts a gasket having a lip projecting out of the upper edge, and s bending in contact with a side rim of the top, the side rim overlapping the upper edge, and comprising at least two latches, connected on one side to the base, and having a bending line with a smaller thickness, and a projecting hook at the opposite side, to be restrained in a slot in the top, so that in operation the latch bends in the bending line and the projecting hook can be engaged to or disengaged from the slot.

23 Claims, 9 Drawing Sheets

CLOSURE SYSTEM FOR A CAGE CONTAINING LABORATORY ANIMALS AND METHODS THEREOF

This application claims the benefit of U.S. Provisional Patent Application Ser. No. 60/680,980, filed May 13, 2005, which is herein incorporated by reference in its entirety.

FIELD OF THE INVENTION

The present invention relates to an improved closure system for a cage containing laboratory animals.

BACKGROUND

A way of isolating laboratory test animals from each other and from the personnel and, at the same time, of reducing operating costs is to enclose them, either alone or in small homogeneous groups, in containers, usually small cages. Inside the cages the most convenient microclimate for the life of the animals is realized. Great care is taken to provide the container inside with a change of air adequate for maintaining low levels of ammonia and carbon dioxide concentrations, which substances are harmful to the animals good health.

These cages are provided with means connecting the same with a pipe (or equivalent system) conveying air (generally filtered and decontaminated) at the desired pressure: the connecting system will maintain—at least for a short time—the container isolated and protected from the external environment, should the container be disconnected from the pipe and moved for any reason.

The cages are generally placed on racks (either open or closed by doors or the like) attached to a framework, which is the stationary component of the breeding department. This support framework is provided with a system that supplies the single cages with air and, preferably, but not necessarily, with the water to be conveyed to the drinking-troughs, if any.

The known cages are normally closed by a plastic top equipped with latches, inlet and outlet air valves, external water bottle and, inside the cage, a wire bar lid with a nylon gasket fitted on the upper profile of the cage base.

The problems to be faced with the above kind of cages are an increasing need for improving the containment at cage level while keeping the practicality of use, reducing the number of cage components, increasing the number of cages within the rack footprint and standardising of rack structure.

A further problem also to be solved is to improve the manner for positioning and keeping stable and firm the cages to the rack.

SUMMARY

Therefore one purpose of the present invention is to provide an improved closure system for a cage containing laboratory animals to solve the above problems.

The present invention provides an improved closure system for a cage containing laboratory animals, the cage comprising a top and a base, air inlet and outlet valves, a filter retainer in the top, comprising at the boundary between the top and the base at an edge in one side of the boundary a U-like shaped housing towards the outside of the edge; a first gasket housed in the edge, the first gasket having a lip projecting out of the upper edge, and bending in contact with a side rim in the other side of the boundary, the side rim overlapping the upper edge.

The U-like shaped housing may be either in the base or in the top, and the side rim may be either in the top or in the base.

The above purpose is achieved by an improved closure system for a cage containing laboratory animals as described in the attached claims, which are considered an integral part of the present description.

BRIEF DESCRIPTION OF THE DRAWINGS

The invention will become clear from the following detailed description, given by way of a mere exemplifying and non limiting example, to be read with reference to the attached drawing figures, wherein.

The same reference numerals and letters in the figures designate the same or functionally equivalent parts.

DETAILED DESCRIPTION

Figure 1:
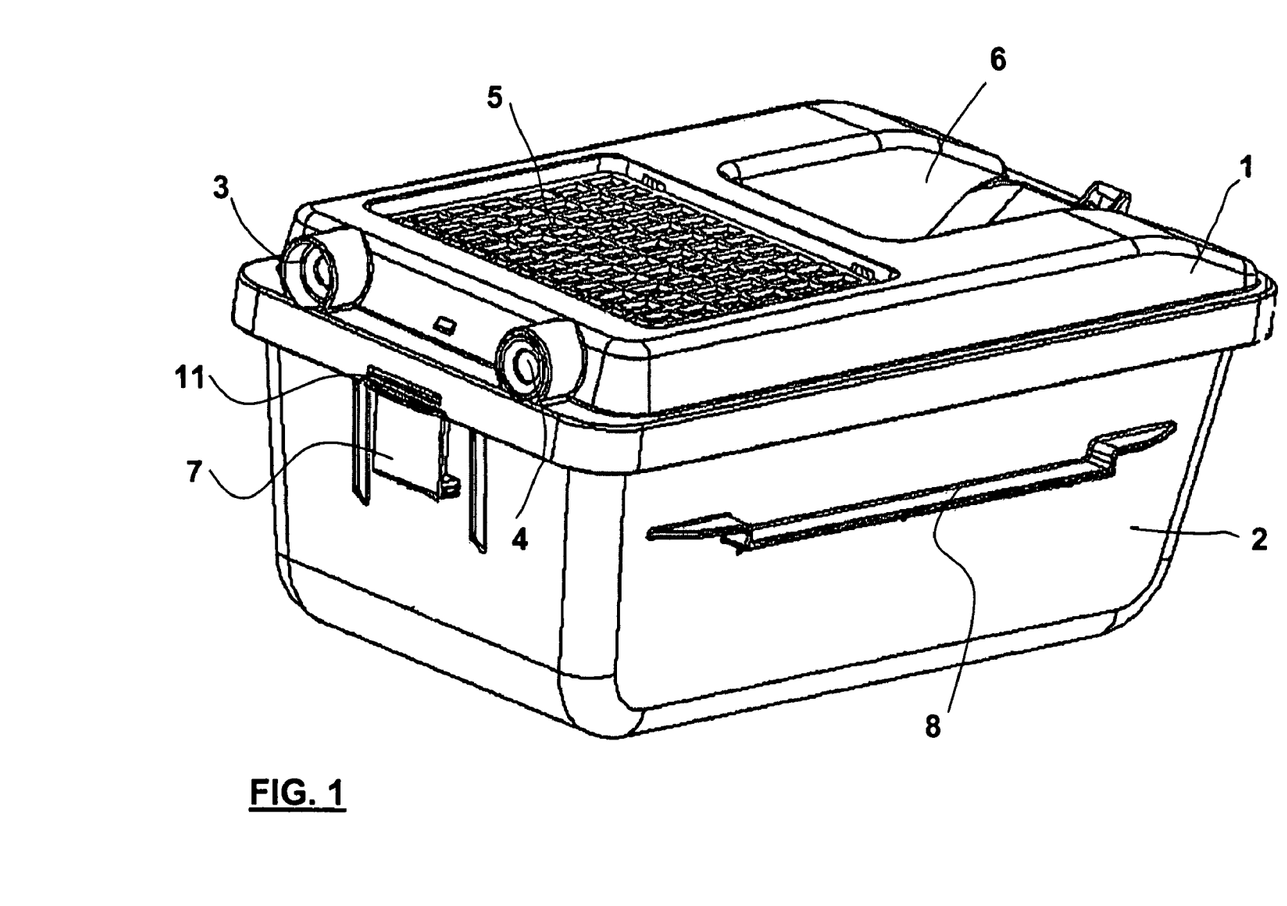
FIG. 1 shows a cage in accordance with the invention.
Figure 2:
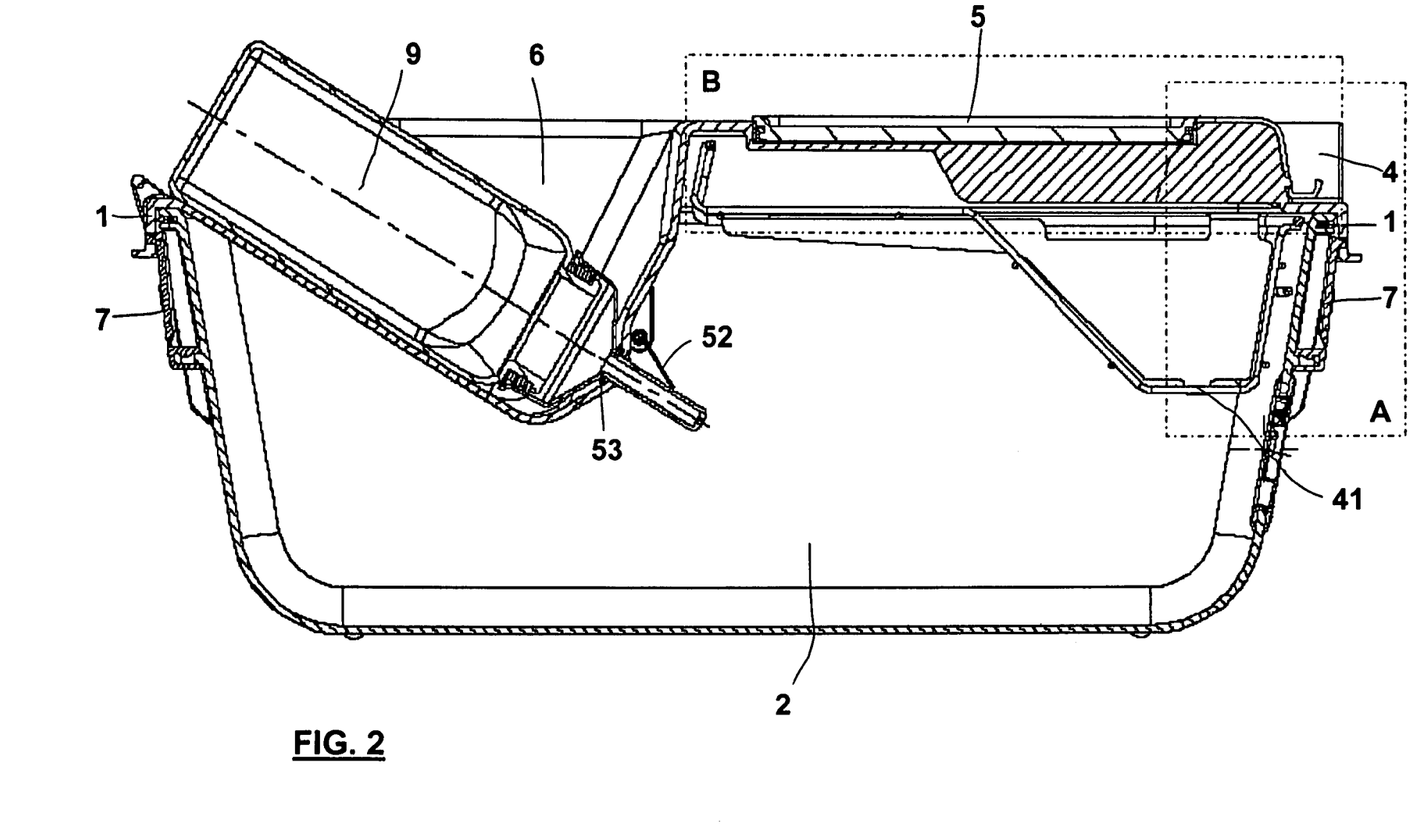
FIG. 2 shows a side section of the cage.

In FIGS. 1 and 2, the cage comprises a top part 1, a base part 2, air inlet and outlet valves 3, 4, a filter retainer 5 in the top, a depression 6 in the top for retaining a bottle 9, two latches 7 and two side runners 8 (one is shown only in FIG. 1).

Figures 2A, 2B, 3:
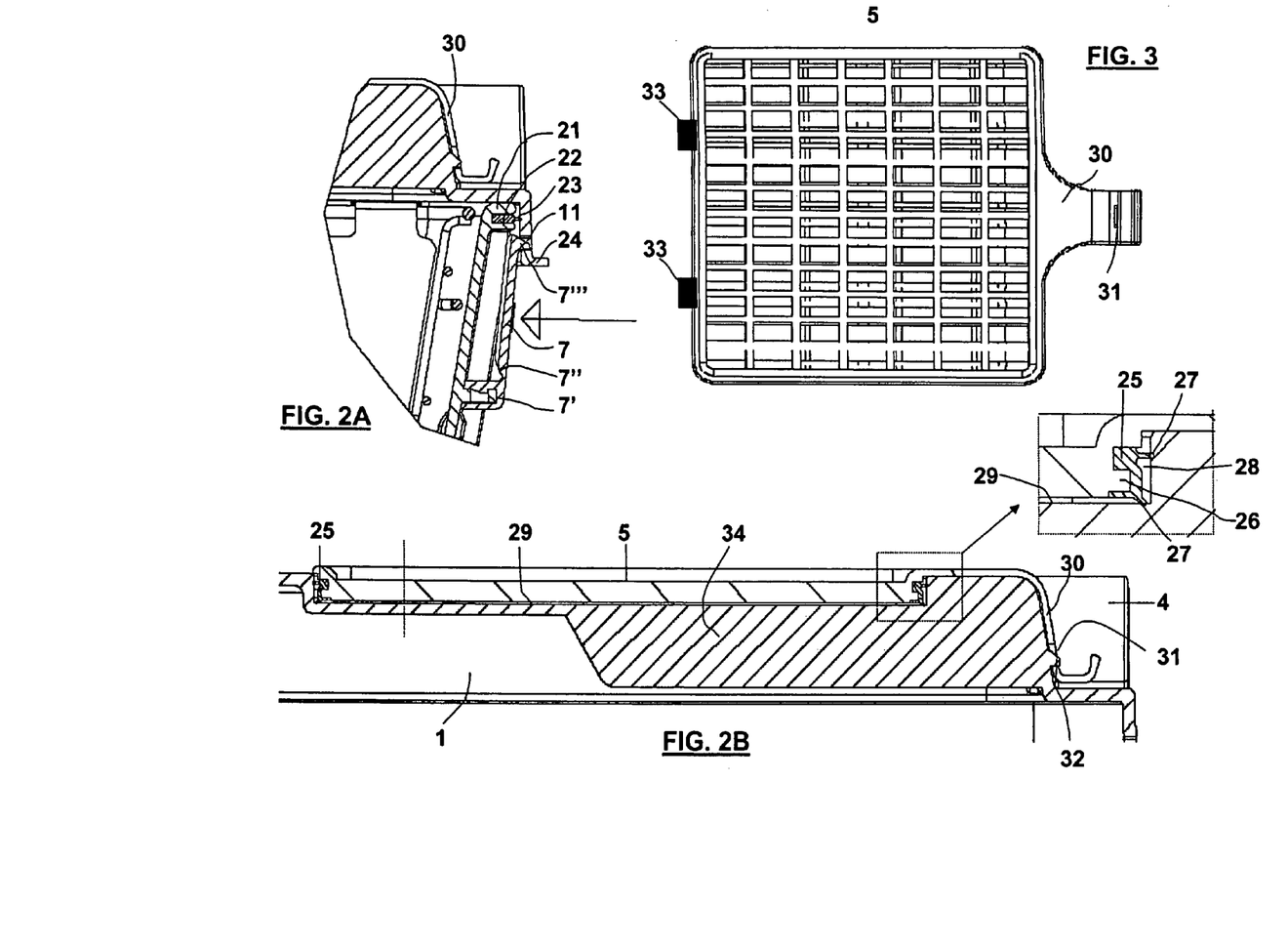
FIGS. 2A and 2B show enlarged particulars of parts A and B of S FIG. 2.
FIG. 3 shows a filter retainer.

In FIG. 2A the upper edge 21 of the base part 2 has a U-like shaped housing towards the outside of the edge, where a gasket 22 is housed. The gasket 22 is preferably made of silicone, and has a lip 23 projecting out of the U-like shaped edge, and bending in contact with the side rim 24 of the top 1, which overlaps the edge 21 of the base, although the gasket 22 can be made of other materials and have other shapes. Preferably, the gasket 22 is radially covering the whole of the circumference of the base edge, ensuring the complete sealing of the cage, although other configurations could be used.

The latch 7 has a form of a plate, is connected on one side 7' to the base 2, shows a bending line 7" with a smaller thickness, and a projecting hook 7'" at the opposite side, restraining in a suitable slot 11 made in the top.

In FIGS. 2B and 3, the filter retainer 5 is in the form of a squared plastic grid, held in a suitable recess in the top, and sealed to the recess by a specially designed gasket 25, preferably made of silicone, around the perimeter of the retainer. Preferably, the gasket 25 has a U-like shape, housed in a perimeter projection 26 of the retainer, although the gasket 25 could have other shapes other configurations could be used.

The gasket 25 has one or more lips 27 projecting out of the retainer edge and bending in contact with the side rim 28 of the recess in the top and ensuring the sealing. The retainer 5 holds pressed a filter sheet 29, preferably a microbiological filter media, or REEMAY® filter paper provided by Fiberweb of London, United Kingdom, although other types of filter media and other filters could be used. The retainer 5 is fixed to the top 1 on one side by a clip 30 having a slot 31 restraining in a hook 32 in the top 1, and on the opposite side by tabs 33 restraining in corresponding slots in the side rim of the recess.

A plastic divider 34 is present between the air inlet and outlet valves 3, 4, in the internal part of the top, to channel the air to the front of the cage, thus to improve the ventilation efficiency, and to avoid any air shortcut between the two valves.

Figure 4A:
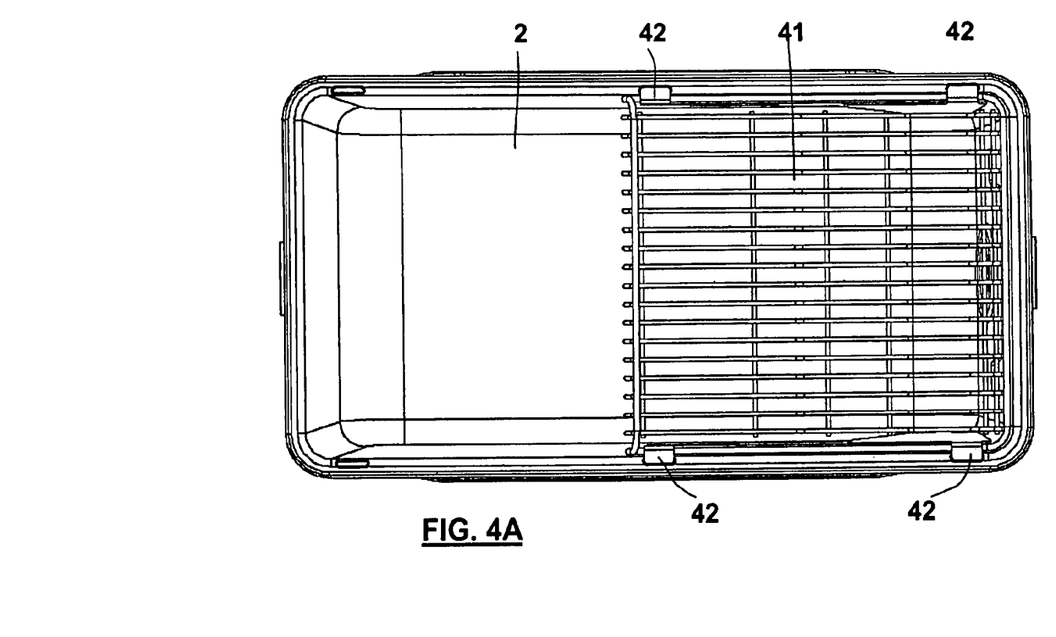
FIGS. 4A and 4B show a top view and a side partial section of the cage.
Figure 4B:
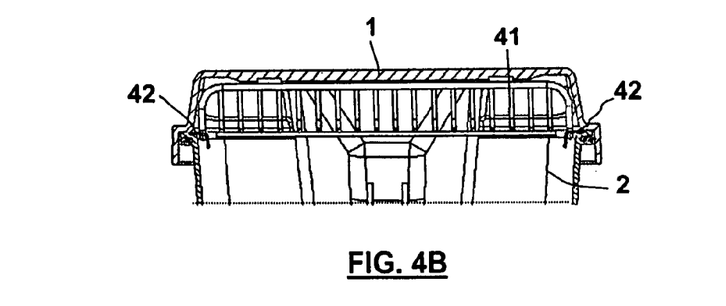

As shown in FIGS. 4A and 4B, inside the cage there is a lid 41 in the form of a grid, preferably made of stainless steel or plastics, covering a part only of the cage, approximately one half. The lid works as a feeder and protects some plastic parts of the cage above it from being chewed by the animals. The lid 41 (also shown in FIG. 2) is suspended in the upper part of the base 2 by a number of flaps 42 attached to the internal part of the upper edge of the base 2.

The feature of the lid of covering a part only of the cage also solves the problem of rendering the interior of the cage more visible and accessible by the operator without removing the lid.

Figure 5:
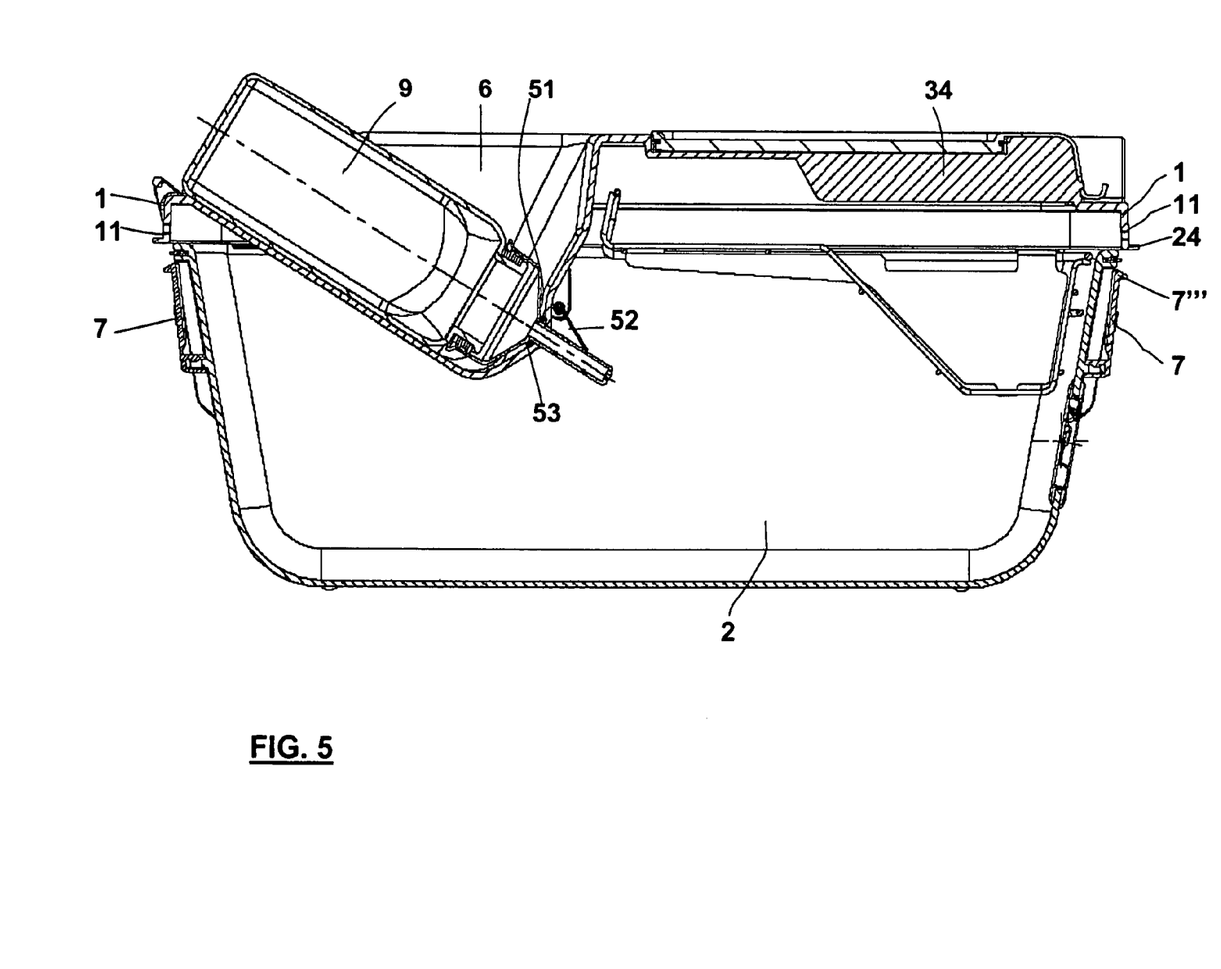
FIG. 5 shows the cage with the top open.

With reference to FIG. 5 showing a cage with the top removed over the base, in operation for closing the cage the latches 7 are not touched and the top is simply let fall down on the base. The latches 7 bend towards the base 2 due to the impact with the side rim 24 of the top 1, and the projecting hook 7''' of the latches restrains in the slot 11, fixing the top 1 to the base 2. The lip 23 of the gasket 22 bends in contact with the top.

For removing the top 1 from the cage, at least one of the latches 7 is pressed, disengaging the hook 7''' from the slot 11, to let the top lift up.

The bottle 9 is inserted in a hole 51 of the depression 6 of the top, opening a flap 52 designed to seal the hole ,51 when the bottle is removed. An O-ring gasket 53 around the bottle seals the hole 51 when the bottle is in. The depression in the top allows the removal of the bottle without the need of opening the cage, thus reducing the technicians' workload.

Figure 7:
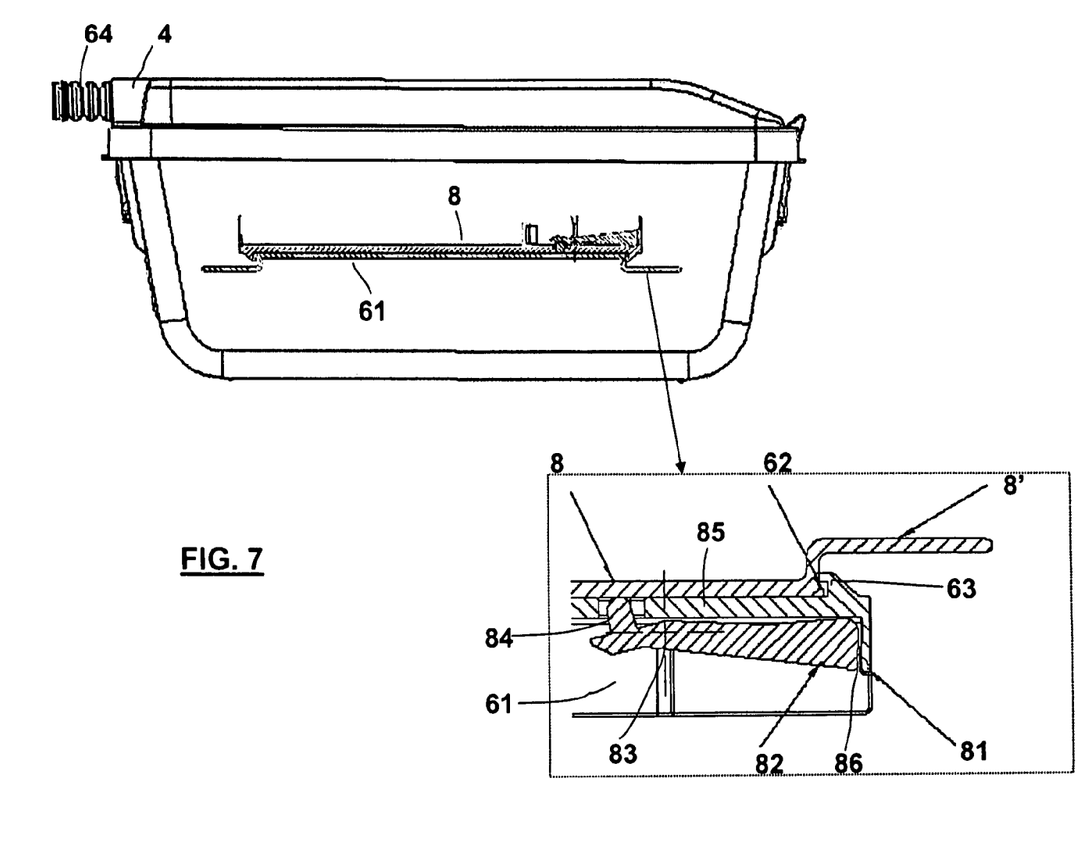
FIG. 7 shows the cage with the suspension means to the rack.

With reference to FIGS. 1 and 7, two side runners 8 keep the cage suspended on a rack (not shown) with an automatic self-locking mechanism.

The side runners 8 are positioned on horizontal slide rails 61 of the rack. As can be seen better in the enlargement of FIG. 7, the side runners 8 have locking lips 62 at their ends that, with the cage inserted in the rack, enter rail grooves 63 at end raisers of the slide rails 61, locking the cage to the rack.

The air inlet and outlet ports of the rack (not shown in the figure), connected in a known way to the air pipelines of the rack, are equipped with elastic bellows 64 fitting with the valves 3, 4 of the cage. This way, when the cage is inserted in the rack, the air flows between the air pipelines of the rack and the internal part of the cage, through the valves 3, 4.

To insert the cage into the rack, the side runners 8 slide on the slide rails 61, all the way down, till when the elasticity of the bellows 64 is taken advantage of, as they secure elastically to the valves 3 and 4 and to the rack, then the front of the cage is pushed down and therefore the locking lips 62 of the side runners secure themselves definitively to the corresponding rail grooves 63 of the slide rails 61.

To remove the cage from the rack, the cage is pushed towards the bellows 64, the front end of the cage is raised, so that the front locking lips 62 lift up in relation to the corresponding rail grooves 63 (see also FIG. 8), and the cage is removed, unbinding the bellows 64 from the valves 3 and 4.

Figure 8:
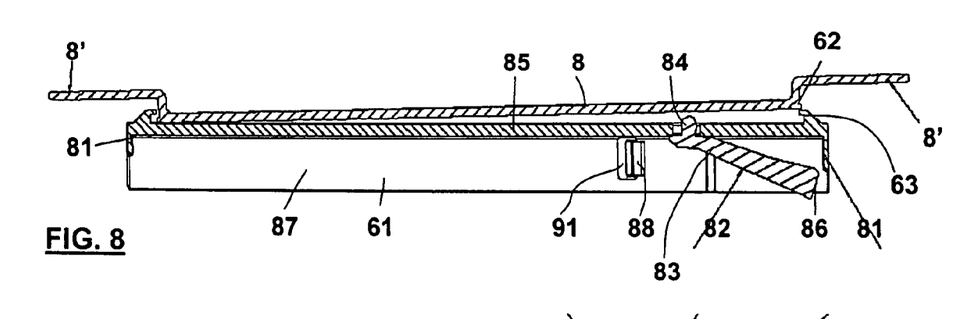
FIGS. 8-14 show particulars of the side runners of the cage and of the slide rails of the rack, forming the suspension means.
Figure 9:
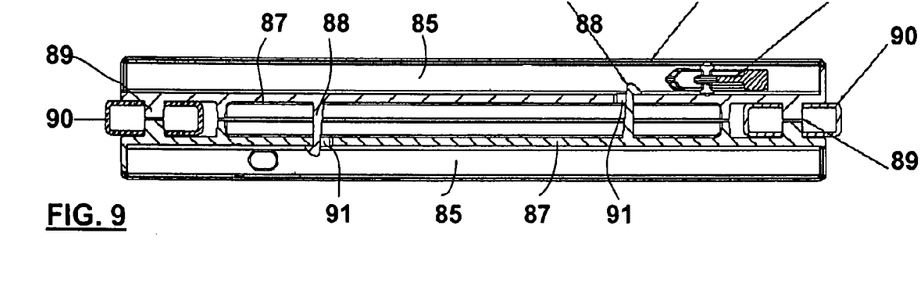
Figure 10:
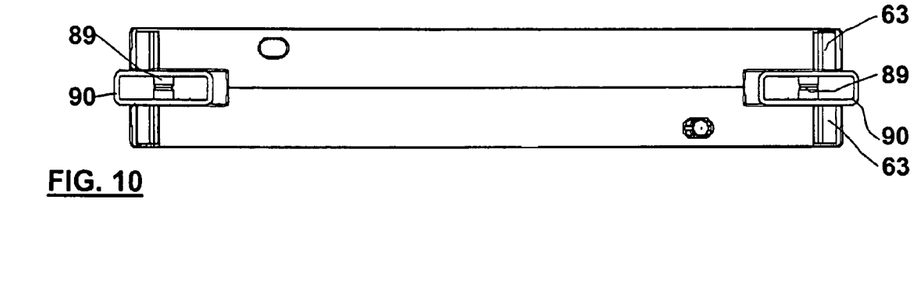
Figure 11:
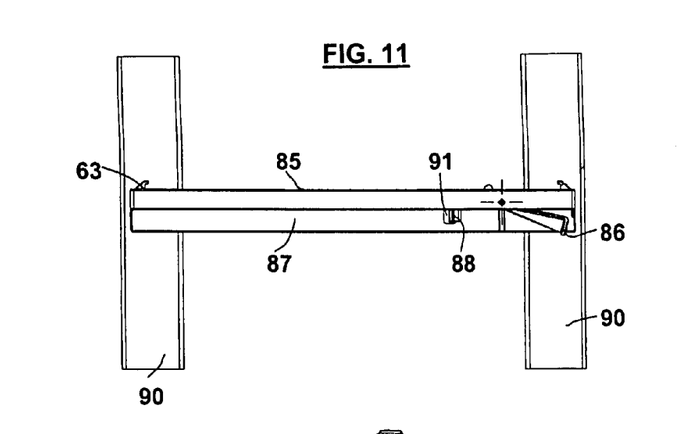
Figure 12:
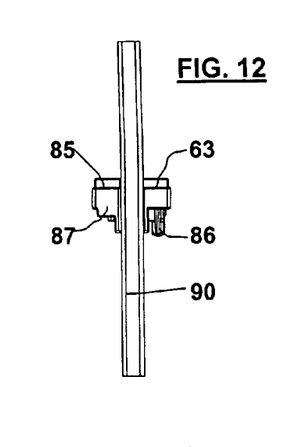
Figure 13:
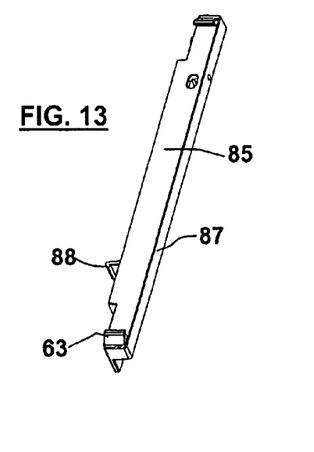
Figure 14:
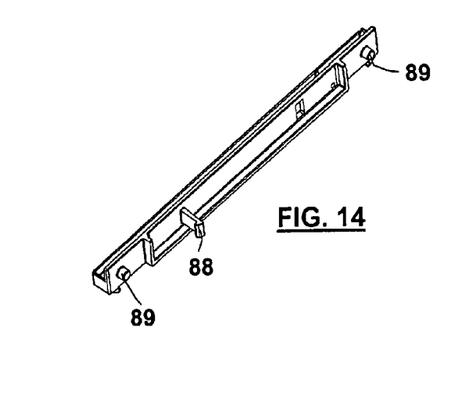

With reference to the enlargement of FIG. 7 and to FIG. 8, a docking indicator 82 is present just below a horizontal upper side 85 of the slide rail 61, and behind the front end 81 of the slide rail bending down. The docking indicator is in the form of a lever pivoting around a pivoting point 83 where it is fixed on the slide rail. An internal arm of the docking indicator has a protrusion 84 which can enter a hole in the upper side 85.

When the cage is not present or is disengaged over the slide rails 61 of the rack and is not firmly fixed (FIG. 8), the front part of the side runners 8 of the cage is raised with respect to the horizontal upper side 85 of the slide rail 61, so as the protrusion 84 raises and exits out of the hole in the upper side 85, while the end 86 of the opposite arm of the docking indicator 82 goes down below the front end 81 of the slide rail and becomes visible from the front part of the rack. This is used as an indication for the operator that the cage is not firmly fixed to the rack and that an intervention is needed to fix the cage the right way. For a better visibility, the docking indicator can have a brilliant color, like red for example.

When instead the cage is firmly fixed on the slide rails (enlargement of FIG. 7), the protrusion 84 is pushed down by the side runner 8, and the end 86 of the opposite arm of the docking indicator 82 is going up and disappears behind the front end 81. This is used as an indication for the operator that the cage is firmly fixed to the rack.

With reference to the FIGS. 9 to 14, further particulars of the slide rails 61 of the rack are shown.

A slide rail has a horizontal side 85 and a vertical side 87. In the vertical side 87 towards the rack there are one or more protruding hooks 88 and one or more protruding buttons 89. The latter enter corresponding holes in the walls 90 of the rack.

Each slide rail, when fixed to a wall 90 of the rack, faces an opposite slide rail carrying the next cage in the rack, so as two opposite slide rails have a specular shape. The protruding buttons 89 enter the holes in the walls 90 and the protruding hooks 88 engage with corresponding holes 91 in the faced slide rail. This way the couple of slide rails are firmly fixed to the walls 90 of the rack.

Many variants are possible to the embodiment example described above, without going out of the scope of the invention.

Figure 6:
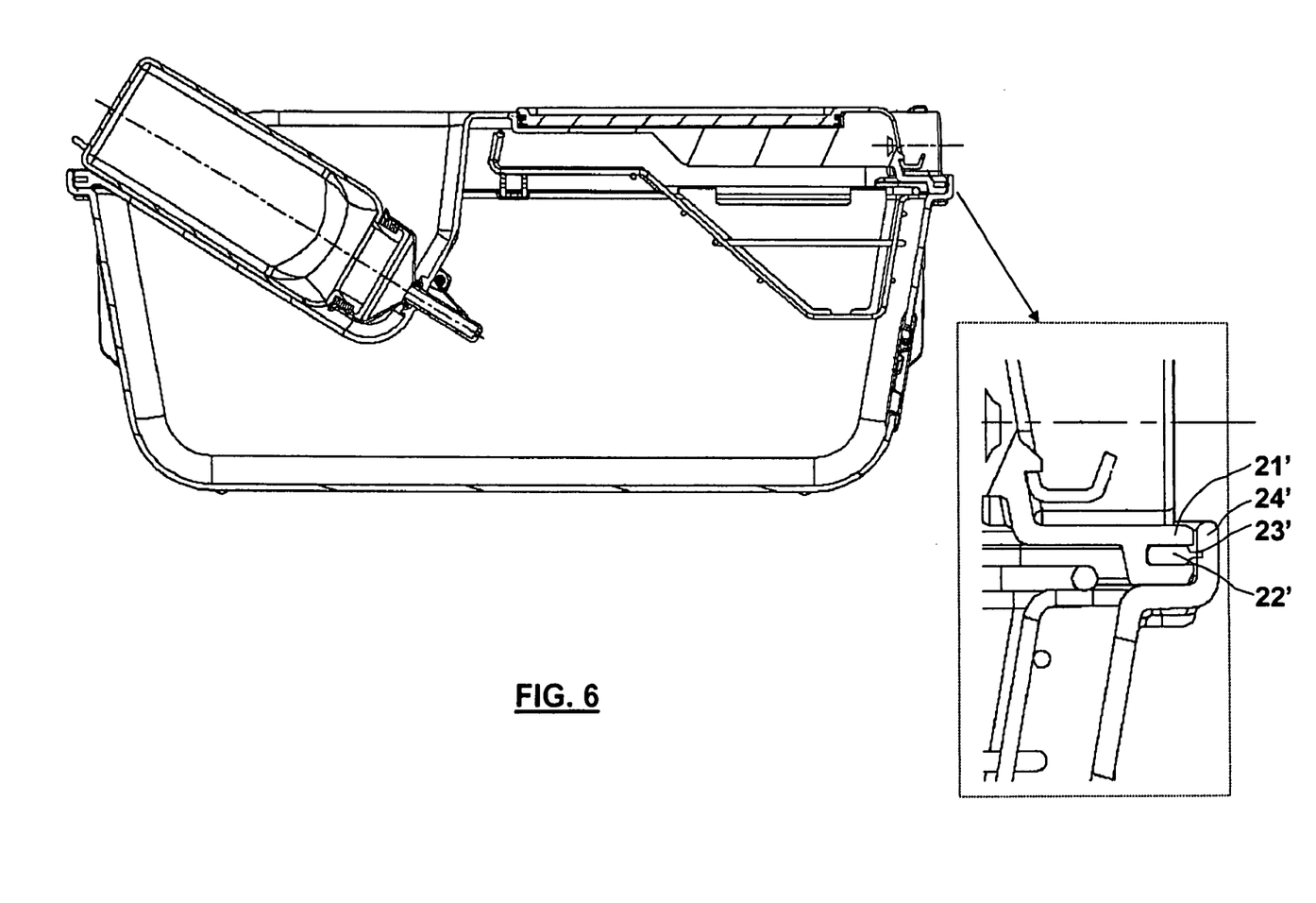
FIG. 6 shows a variant of the cage in accordance with the invention.

For example, with reference to FIG. 6, the gasket can be held in the top part, and bending against a rim in the upper part of the base.

In FIG. 6 the edge 21' of the top part 1 has a U-like shaped housing towards the outside of the edge, where a gasket 22' is housed. The gasket 22' has a lip 23' projecting out of the U-like shaped edge, and bending in contact with the side rim 24' of the base 2, which overlaps the edge 21' of the top. Preferably the gasket 22' is radially covering the whole of the circumference of the top edge, ensuring the complete sealing of the cage, although the gasket 22' can have other sealing configurations.

With the present invention, a number of advantages are achieved.

The sealing is ensured by the gasket lip bending in contact with the side rim only; the latches are mainly present for the purpose of avoiding unwanted opening of the cage.

The embodiments of the present invention aim at improving the containment at cage level while keeping the practicality of use, reducing the number of cage components, increasing the number of cages within the rack footprint and standardizing the rack structure.

Further implementation details will not be described, as the one of ordinary skill in the art is able to carry out the invention starting from the teaching of the above description.

The system comprising the side runners 8, the slide rails 61, the locking lips 62, the rail grooves 63, the docking indicator 82 as described above is suitable to be applied to any kind of cages containing laboratory animals and relating rack for the insertion of a number of the cages.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An improved closure system for a cage containing laboratory animals, the cage comprising a top and a base, air inlet and outlet valves, a filter retainer in the top, wherein at a boundary between the top and the base the system comprises:
   at an edge in one side of the boundary a substantially U-shaped housing towards the outside of the edge;
   a first gasket housed substantially within the substantially U-shaped housing in the edge, the first gasket having a lip projecting out of the edge, the lip in an unengaged position remains within boundaries defined by and extending out from opposing inner sides of the substantially U-shaped housing and in an engaged position has a length for an end of the lip to engage with and bend with contact from one of a side rim of the top and a side of the base which faces an opening to the substantially U-shaped housing;
   wherein the opening to the substantially U-shaped housing faces out from one of the side of the base and the side rim of the top.

2. The system according to claim 1, wherein the substantially U-shaped housing is in the base and the side rim is in the top.

3. The system according to claim 1, wherein the substantially U-shaped housing is in the top and the side rim is in the base.

4. The system according to claim 1, wherein the first gasket is radially covering the whole of the circumference of the upper edge, and is made of silicone.

5. The system according to claim 1, further comprising at least two latches, connected on one side to the base, and having a bending line with a smaller thickness, and a projecting hook at the opposite side, to be restrained in a slot in the top, so that in operation the latch bends in the bending line and the projecting hook can be engaged to or disengaged from the slot.

6. The system according to claim 5 wherein at least one of the at least two latches is positioned adjacent the first gasket so that in operation the latch bends in the bending line so the projecting hook can be engaged or disengaged from the slot in the top without disrupting a seal between the lip and the side rim.

7. The system according to claim 1, further comprising a filter retainer for one or more filter sheets in the top, sealed to the top by a second gasket.

8. The system according to claim 7, wherein the filter retainer is held in a recess in the top, and sealed to the recess by the second gasket around the perimeter of the filter retainer, the second gasket having one or more lips projecting out of the retainer edge and bending in contact with a side rim of the recess.

9. The system according to claim 8, wherein the filter retainer is fixed to the top on one side by a clip having a slot restraining in an hook in the top, and on the opposite side by tabs restraining in slots in a side rim of the recess.

10. The system according to claim 7, wherein the filter retainer has a perimeter projection, the second gasket being U-shaped housed in the perimeter projection.

11. The system according to claim 1, further comprising a lid inside the cage, in the form of a grid, covering only a part of the cage, the lid being suspended in an upper part of the base by a number of flaps attached to an internal part of the upper edge of the base.

12. The system according to claim 1, further comprising a hole in a depression of the top, for inserting a bottle that opens a flap, the flap designed to seal the hole when the bottle is removed, and an O-ring gasket around the bottle sealing the hole when the bottle is inserted in the hole.

13. The system according to claim 1, wherein the cage further comprises a plastic divider between the air inlet and outlet valves, in the internal part of the top, to channel the air to the front of the cage to improve the ventilation efficiency and avoid any air shortcut between the two valves.

14. A container system comprising:
   a cage comprising a top and a base:
   a substantially U-shaped housing extending from an edge in one side of a boundary between the top and the base; and
   a first gasket housed substantially within the substantially U-shaped housing in the edge, the first gasket having a lip projecting out of the edge, the lip in an unengaged position remains within boundaries defined by and extending out from opposing inner sides of the substantially U-shaped housing and in an engaged position has a length for an end of the lip to engage with and bend with contact from one of a side rim of the top and a side of the base which faces an opening to the substantially U-shaped housing;
   wherein the opening to the substantially U-shaped housing faces out from one of the side of the base and the side rim of the top.

15. The system according to claim 14 at least one latch connected on one side to the base, and having a bending line with a smaller thickness, and a projecting hook at the opposite side, to be restrained in a slot in the top, so that in operation the latch bends in the bending line and the projecting hook can be engaged to or disengaged from the slot without disrupting a seal between the lip and the side rim.

16. The system according to claim 14 further comprising a filter retainer for one or more filter sheets in the top sealed to the top by a second gasket.

17. The system according to claim 16, wherein the filter retainer is held in a recess in the top, and sealed to the recess by the second gasket around the perimeter of the filter retainer, the second gasket having one or more lips projecting out of the retainer edge and bending in contact with a side rim of the recess.

18. The system according to claim 16, wherein the filter retainer has a perimeter projection, the second gasket being U-shaped housed in the perimeter projection.

19. A method of making a container system, the method comprising:
   providing a cage comprising a top and a base;
   placing a substantially U-shaped housing extending from an edge in one side of a boundary between the top and the base; and
   housing a first gasket substantially within the substantially U-shaped housing in the edge, the first gasket having a lip projecting out of the edge the lip in an unengaged position remains within boundaries defined by and extending out from opposing inner sides of the substantially U-shaped housing and in an engaged position has a length for an end of the lip to engage with and bend with contact from one of a side rim of the top and a side of the base which faces an opening to the substantially U-shaped housing;

wherein the placing further comprises placing the opening to the substantially U-shaped housing to face out from one of the side of the base and the side rim of the top ensuring that the first gasket having the lip projecting out of the edge is not reachable by an animal housed inside the cage.

20. The method according to claim 19 providing at least one latch connected on one side to the base, and having a bending line with a smaller thickness, and a projecting hook at the opposite side, to be restrained in a slot in the top, so that in operation the latch bends in the bending line and the projecting hook can be engaged to or disengaged from the slot without disrupting a seal between the lip and the side rim.

21. The method according to claim 19 further comprising providing a filter retainer for one or more filter sheets in the top sealed to the top by a second gasket.

22. The method according to claim 21, wherein the filter retainer is held in a recess in the top, and sealed to the recess by the second gasket around the perimeter of the filter retainer, the second gasket having one or more lips projecting out of the retainer edge and bending in contact with a side rim of the recess.

23. The method according to claim 21, wherein the filter retainer has a perimeter projection, the second gasket being U-shaped housed in the perimeter projection.

* * * * *